UNITED STATES PATENT OFFICE.

JAMES H. CONNOR, OF SHARPSBURG, PENNSYLVANIA.

PROCESS OF MANUFACTURING FERTILIZER.

1,283,677.

Specification of Letters Patent. Patented Nov. 5, 1918.

No Drawing. Application filed September 23, 1914. Serial No. 863,105.

*To all whom it may concern:*

Be it known that I, JAMES H. CONNOR, a resident of Sharpsburg, in the county of Allegheny and State of Pennsylvania, have invented a new and useful Improvement in Processes of Manufacturing Fertilizer, of which the following is a specification.

This invention relates to a process of manufacturing artificial fertilizer, and particularly a fertilizer which can be made from furnace flue dust, iron ore or other cheap substances or products. The object of the invention is to provide a method of manufacturing a cheap and efficient fertilizer having a certain percentage of potash or potassium compound which is readily soluble and therefore available to enrich the soil.

Blast furnaces produce large quantities of flue dust, which is usually a waste product and which entails expense for hauling it away or otherwise disposing of it. Such flue dust is made up of a mixture of iron oxid, silica, lime, particles of carbon, and other substances, and also contains a considerable amount of sodium and potassium compounds, derived in part from the iron ore, and in part from the coal or coke and limestone added to the burden of the furnace. All of these substances contain a certain amount of potassium compounds, as impurities, and these potassium compounds go out mostly with the flue dust.

The purpose of the present invention is to render the potassium compounds of the flue dust soluble and available as a fertilizer, thereby producing a fertilizer at comparatively low cost, due to the fact that flue dust practically has no value. Certain iron ores also contain a very material quantity of potassium compounds and in localities where these are available at comparatively low cost, they may be used in place of the flue dust.

The potassium compounds of the flue dust or other iron compounds are rendered soluble and available by heating or calcining the flue dust or iron ore with a sodium compound, and where sodium compounds containing potash or potassium compounds can be obtained at a low cost, these are preferred as their potassium content will increase the available potash in the fertilizer. Salt residue, that is the residue in the evaporating pans or pots after the crystallization of the sodium chlorid, is a cheap form of sodium compound suitable for rendering the potassium compounds of the flue dust or iron ore soluble, as well as increasing the available potash in the fertilizer.

In carrying out the process, the flue dust, iron ore or other iron compound, in a finely divided condition, is mixed with a suitable quantity of the sodium compound, such as the salt residue above referred to, and the mixture is then heated in a suitable oven or kiln to the temperature ranging from 1350 to 3000° Fahrenheit. The oven or kiln may be of any suitable kind, heated either by gas, electricity, or in any other manner. The substances may be mixed either wet or dry and either hot or cold. They may be mixed with water in a suitable mixer and then fed into the oven or kiln, or may be fed into the oven or kiln in a dry state. These substances may be mixed in any suitable proportions, depending upon the amount of potassium compounds in the several ingredients and the amount of available potash desired in the fertilizer. Preferably they are treated in batches containing from 1200 to 1800 pounds of flue dust or other iron compound and having mixed therewith from 5% to 25% of the salt residue.

By heating these substances to the temperature above specified, the potassium compounds of the flue dust or iron ore are rendered soluble and available as a fertilizing compound, and if the sodium compound also contains potassium compounds, these are added to the fertilizer and increase the available potash content of the latter. In this manner an efficient fertilizer containing appreciable quantities of potash in a soluble and available form, is produced.

After calcining, the mass is cooled and is then available as a fertilizer, but preferably it is ground to a suitable fineness to more thoroughly mix the ingredients and enable the potash to be more easily absorbed by the soil.

Various other substances may be used either with or as a substitute for the flue dust or iron ore, depending upon what substances it is desired to furnish to the soil. Such substances, for example, are carbon in the form of ground coal, coke or charcoal, other iron compounds, such as the ferrous or ferric carbonate, chlorid, oxid, sulfate, phosphate or sulfid, compounds of manganese, such as the oxid, carbonate and chlorid, calcium or magnesium oxid or carbonate, potassium nitrate, chlorate or phosphate, aluminum compounds, sulfur, and phosphorus in various forms. The salt or soda compound may also be in various forms, such as sodium carbonate, sodium sulfate, caustic soda, salt bottoms, sodium chlorid, sodium nitrate, sodium phosphate, sodium silicate, sodium sulfid, caustic soda bottoms, salt cake, sodium thiosulfate, niter, or sodium peroxid.

When the substances are heated or fused together in a rotary kiln or furnace to the proper temperature the various ingredients become available and soluble, producing a fertilizer containing from 2 to 18 per cent. of soluble potash material, or even higher according to the particular ingredients added. Steam may also be passed into the rotary kiln, furnace or oven, which has a tendency to hasten the reaction and more quickly render the potash compounds soluble and available.

The fertilizer can be made almost wholly from waste or cheap substances and is a very efficient fertilizer, due to the potassium compounds contained therein.

What I claim is:—

1. The process of producing artificial fertilizer, consisting in mixing salt residue with an iron compound and a potassium compound in a fine condition, and calcining the mixture and thereby reducing the potash compound in the iron compound to a soluble or available form.

2. The process of producing artificial fertilizer, consisting in mixing flue dust containing iron and potassium compound and a sodium compound, and calcining the mixture to thereby reduce the potassium compound in the flue dust to a soluble or available form.

3. The process of producing artificial fertilizer, consisting in mixing flue dust containing iron and potassium compound and salt residue, and calcining the mixture to thereby reduce the potassium compound in the flue dust to a soluble or available form.

4. The process of producing artificial fertilizer, consisting in mixing flue dust containing iron and potassium compound with from 5% to 25% of sodium compound, and heating the mixture and thereby reducing the potassium compound of the flue dust to a soluble or available form.

5. The process of producing artificial fertilizer, which consists in mixing blast furnace flue dust containing iron and potassium compound and salt residue, and calcining the mixture to thereby reduce the potassium compound in the flue dust to a soluble or available form.

In testimony whereof I have hereunto set my hand.

JAMES H. CONNOR.

Witnesses:
CLARENCE E. REEMTSEN,
REESE E. RUDOLPH.